US011221968B1

(12) United States Patent
Rellinger et al.

(10) Patent No.: US 11,221,968 B1
(45) Date of Patent: *Jan. 11, 2022

(54) SYSTEMS AND METHODS FOR SHADOW COPY ACCESS PREVENTION

(71) Applicant: Stealthbits Technologies LLC, Hawthorne, NJ (US)

(72) Inventors: Steve Rellinger, Waldwick, NJ (US); Sean Bergman, Jersey City, NJ (US); Pavel Shmakov, Moscow (RU)

(73) Assignee: Stealthbits Technologies LLC, Hawthorne, NJ (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/786,643

(22) Filed: Feb. 10, 2020

Related U.S. Application Data

(63) Continuation of application No. 15/649,931, filed on Jul. 14, 2017, now Pat. No. 10,606,766.

(51) Int. Cl.
G06F 12/14 (2006.01)
G06F 21/60 (2013.01)
G06F 21/62 (2013.01)
G06F 21/50 (2013.01)

(52) U.S. Cl.
CPC .......... G06F 12/1416 (2013.01); G06F 21/60 (2013.01); G06F 21/62 (2013.01); G06F 12/14 (2013.01); G06F 21/50 (2013.01)

(58) Field of Classification Search
CPC ............... G06F 3/00; G06F 3/06–0689; G06F 9/00–548; G06F 11/00–3696; G06F 12/00–1416; G06F 12/1425–16; G06F 13/00–4295; G06F 21/00–88; G06F 2009/3883; G06F 2009/45562–45595; G06F 2201/00–885; G06F 2209/00–549; G06F 2211/00–2153; G06F 2212/00–7211; G06F 2221/00–2153
See application file for complete search history.

(56) References Cited

U.S. PATENT DOCUMENTS

| 5,289,540 | A | 2/1994 | Jones |
| 5,845,295 | A | 12/1998 | Houseman et al. |
| 6,408,336 | B1 | 6/2002 | Schneider et al. |
| 6,622,263 | B1 | 9/2003 | Stiffler et al. |
| 6,986,005 | B2 | 1/2006 | Vo |
| 7,174,436 | B1 | 2/2007 | Langendorf et al. |
| 7,263,590 | B1 | 8/2007 | Todd et al. |
| 7,293,044 | B2 | 11/2007 | Ghotge et al. |

(Continued)

OTHER PUBLICATIONS

R. Heyn et al., "User Tracking for Access Control with Bluetooth Low Energy," 2019 IEEE 89th Vehicular Technology Conference (VTC2019—Spring), 2019, pp. 1-7 (Year: 2019).*

(Continued)

Primary Examiner — Daniel C. Chappell
(74) Attorney, Agent, or Firm — Austin Rapp

(57) ABSTRACT

A method is described. The method includes monitoring a request to access one or more files via a shadow copy on a computing device. The method also includes preventing unauthorized access to the shadow copy based on a shadow copy access policy. Monitoring the request to access a shadow copy may include using a filter driver to intercept a request for a previously created shadow copy or a request to create a shadow copy.

18 Claims, 7 Drawing Sheets

(56) References Cited

U.S. PATENT DOCUMENTS

| | | | |
|---|---|---|---|
| 7,415,591 | B1 | 8/2008 | Todd et al. |
| 7,783,598 | B1 | 8/2010 | Malaiyandi et al. |
| 7,877,553 | B2 | 1/2011 | Vanamamalai et al. |
| 7,953,946 | B2 | 5/2011 | Anand et al. |
| 8,108,935 | B1 | 1/2012 | Sobel et al. |
| 8,200,638 | B1 | 6/2012 | Zheng et al. |
| 9,298,432 | B1 | 3/2016 | Abramau |
| 10,606,766 | B1 * | 3/2020 | Rellinger ............... G06F 21/60 |
| 2003/0210336 | A1 | 11/2003 | Khan et al. |
| 2004/0254936 | A1 | 12/2004 | Mohamed |
| 2007/0101082 | A1 | 5/2007 | Sugiura et al. |
| 2007/0220029 | A1 | 9/2007 | Jones et al. |
| 2010/0057981 | A1 | 3/2010 | Xie et al. |
| 2010/0076936 | A1 | 3/2010 | Rajan |
| 2010/0128866 | A1 | 5/2010 | Irun-Briz et al. |
| 2011/0231443 | A1 | 9/2011 | Hannel et al. |
| 2012/0030760 | A1 | 2/2012 | Lu et al. |
| 2012/0221774 | A1 | 8/2012 | Atkisson et al. |
| 2013/0145128 | A1 | 6/2013 | Schardt et al. |
| 2014/0325616 | A1 | 10/2014 | Dolph et al. |
| 2016/0004599 | A1 | 1/2016 | Mam et al. |

OTHER PUBLICATIONS

"Patch Tuesday: WmiSploit", retrieved from the Internet, www.patch-tuesday.net/2015/04/wmisploit.html Apr. 14, 2015.
Secabstraction / WmiSploit, "WmiSploit / Invoke-WmiShadowCopy.ps1", retrieved from the Internet, https://github.com/secabstraction/WmiSploit/blob/master/Invoke-WmiShadowCopy.ps1 Jun. 10, 2015.
Microsoft, "Volume Shadow Copy Service", retrieved from the Internet, https://web.archive.org/web/20110926084615/http://msdn.microsoft.com:80/en-us/library/windows/desktop/bb968832(v=vs.85).aspx Sep. 26, 2011.
Microsoft, "Shadow Copy Creation for Providers", retrieved from the Internet, https://web.archive.org/web/201 20304013215/https://msdn.microsoft.com/en-us/library/windows/desktop/aa384615(v=vs.85).aspx Mar. 4, 2012.
Microsoft, "Shadow Copy Provider Registration and Loading", retrieved from the Internet, https://web.archive.org/web/20120807045313/https://msdn.microsoft.com/en-us/library/windows/desktop/aa384616(v=vs.85).aspx Aug. 7, 2012.
Microsoft, "File System Minifilter Drivers", retrieved from the Internet, https://web.archive.org/web/20170602213443/https://docs.microsoft.com/en-us/windows-hardware/drivers/ifs/file-system-minifilter-drivers Jun. 2, 2017.
Microsoft, "Filter Manager Concepts", retrieved from the Internet, https://docs.microsoft.com/en-us/windows-hardware/drivers/ifs/filter-manager-concepts Apr. 20, 2017.
Microsoft, "FltRegisterFilter function", retrieved from the Internet, https://web.archive.org/web/20111228182330/http://msdn.microsoft.com:80/en-us/library/windows/hardware/ff544305(v=vs.85).aspx Dec. 28, 2011.
Microsoft, "FltStartFiltering function", retrieved from the Internet, https://web.archive.org/web/20111225002408/https://msdn.microsoft.com/en-us/library/windows/hardware/ff544569(v-vs.85).aspx Dec. 25, 2011.
Acharya et al., "A Guide for SQL Server Backup Application Vendors", SQL Server 2005 Books Online, Microsoft, retrieved from the Internet, https://technet.microsoft.com/en-us/library/cc966520.aspx Sep. 1, 2005.
Microsoft Hardware Dev Center, "Filter Manager Concepts", retrieved from https://docs.microsoft.com/en-us/windows-hardware/drivers/ifs/filter-manager-concepts on Sep. 14, 2018 Apr. 19, 2017.
Animadversor, "Volume Shadow Copy Service warning: VSS was denied access to the root of volume (Win 7 Home Premium)", retrieved from https://superuser.com/questions/243254/volume-shadow-copy-service-warning-vss-was-denied-access-to-the-root-of-volume on Sep. 14, 2018 Feb. 8, 2011.
Office Action issued for U.S. Appl. No. 15/649,931 dated Sep. 19, 2018.
Office Action issued for U.S. Appl. No. 15/649,931 dated Jan. 23, 2019.
Office Action issued for U.S. Appl. No. 15/649,931 dated Jul. 16, 2019.
Notice of Allowance issued for U.S. Appl. No. 15/649,931 dated Jan. 9, 2020.
Prabhakar et al., "On-the-Fly Encryption Security in Remote Storage", Fifth International Conference on Advances in Computing and Communications Sep. 4, 2015.
Graziano et al., "Ropmemu: A Framework for the Analysis of Complex Code-Reuse Attacks", Proceedings of the 11th ACM on Asia Conference on Computer and Communications Security, pp. 47-58 May 2016.
Supplemental Notice of Allowability issued for U.S. Appl. No. 15/649,931 dated Jan. 23, 2020.
Supplemental Notice of Allowability issued for U.S. Appl. No. 15/649,931 dated Feb. 20, 2020.

* cited by examiner

SYSTEMS AND METHODS FOR SHADOW COPY ACCESS PREVENTION

RELATED APPLICATIONS

This application is a continuation of U.S. patent application Ser. No. 15/649,931 entitled "SYSTEMS AND METHODS FOR SHADOW COPY ACCESS PREVENTION," filed on Jul. 14, 2017, which is hereby incorporated by reference herein, in its entirety.

TECHNICAL FIELD

The present disclosure relates generally to computers and computer-related technology. More specifically, the present disclosure relates to systems and methods for shadow copy access prevention.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small handheld computing devices to desktop computer systems to large multi-processor computer systems. In some configurations, multiple computers may communicate in a network environment.

In computing technology, shadow copies may be used to create backups of one or more files on a computing device. However, shadow copies create a mechanism for malicious users and software to gain access to sensitive information on the computing device. By gaining access to a shadow copy, an attacker may gain information to elevate their privileges and gain access to further sensitive data. Benefits may be realized by preventing unauthorized access to shadow copies. It may be especially beneficial to monitor and block access to files in Microsoft Windows desktop and/or server operating systems. However, the systems and methods described herein may be applied to other computing environments that employ shadow copies.

DETAILED DESCRIPTION

Figure 1:
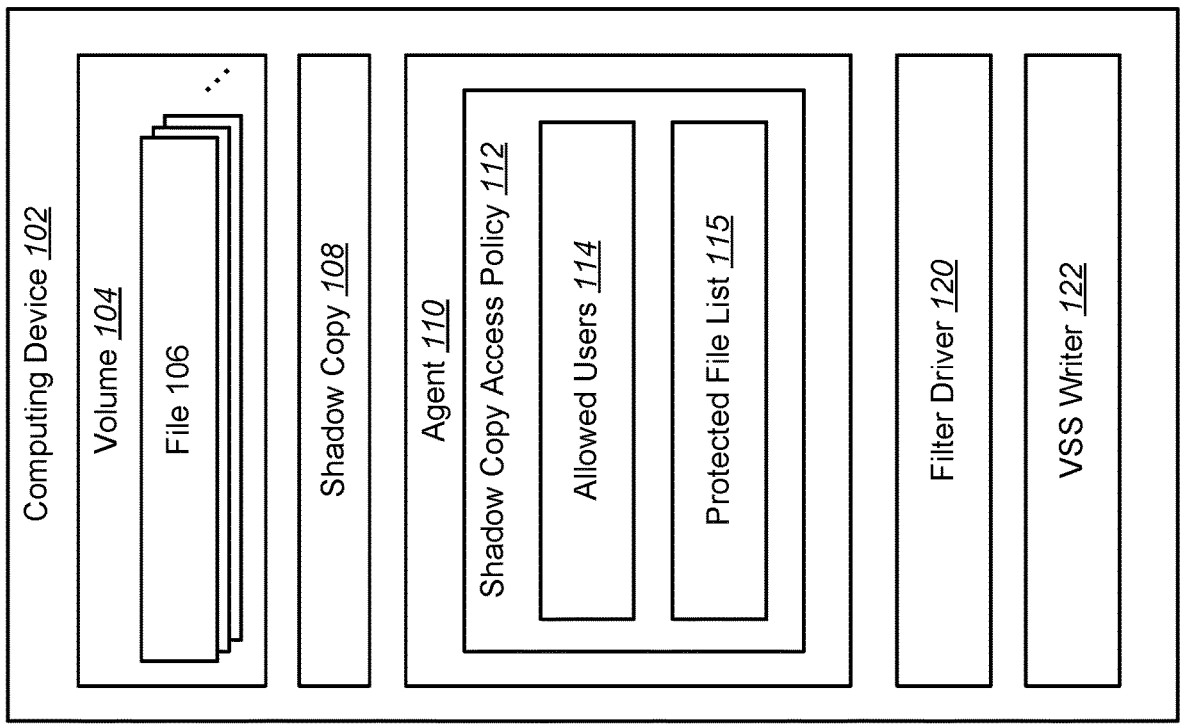
FIG. 1 is a block diagram illustrating one configuration of a computing device in which systems and methods for shadow copy access prevention may be implemented.

A method is described. The method includes monitoring a request to access one or more files via a shadow copy on a computing device. The method also includes preventing unauthorized access to the shadow copy based on a shadow copy access policy.

The request to access the shadow copy may include a request to create a shadow copy of the one or more volumes or a request to access a previously created shadow copy.

Preventing unauthorized access to the shadow copy may include preventing access to the one or more files on the shadow copy based on a specific user, group membership, file path and/or time of day. Preventing unauthorized access to the shadow copy may further include determining whether a user account associated with the request is authorized to access the shadow copy on the computing device. Preventing unauthorized access to the shadow copy may also include determining that a user account is not authorized to access the shadow copy according to the shadow copy access policy.

The method may also include designating one or more protected files with restricted shadow copy access.

Monitoring a request to access a shadow copy may include using a filter driver to intercept a request for a previously created shadow copy. The filter driver may include a file system filter or minifilter driver.

The method may also include loading the filter driver in a kernel of the computing device. The filter driver may be attached to a volume that is being monitored. The request for a previously created shadow copy may be received in a stack of callers.

Upon receiving a request for a shadow copy, the filter driver may determine a user account that is making the request. The filter driver may also determine what volume the shadow copy is for. The filter driver may further determine whether the user account has authorization to access a requested file or folder on the shadow copy based on the shadow copy access policy.

Monitoring a request to access a shadow copy may include invoking a filter driver to intercept a request to create a shadow copy. A volume shadow copy service monitor may access a current executing thread to determine the invoker of the request. If a request to create a shadow copy is not authorized by the shadow copy access policy, the filter driver may prevent the shadow copy from being made.

The method may also include configuring a filter driver to perform copy monitoring via region access. Copy monitoring via region access may include mapping regions in a sensitive file or shadow copy with bits of a bit array. Seeks to read the sensitive file or shadow copy may be observed. Bits associated with the seeks may be marked as dirty. All of the bits may be determined to be dirty before the sensitive file or shadow copy is closed. A flag indicating a copy may be generated.

A computing device is also described. The computing device may include a processor, a memory in electronic communication with the processor, and instructions stored in the memory. The instructions are executable to monitor a request to access one or more files via a shadow copy on the computing device. The instructions are also executable to prevent unauthorized access to the shadow copy based on a shadow copy access policy.

FIG. 1 is a block diagram illustrating one configuration of a computing device 102 in which systems and methods for shadow copy access prevention may be implemented. In particular, the systems and methods disclosed herein may allow for detecting and blocking malicious or unauthorized access to one or more shadow copies 108.

Examples of the computing device 102 include a desktop computer, laptop computer, tablet computer, server, domain controller, etc. The computing device 102 may be configured to communicate in a network environment. In an implementation, the computing device 102 may be a desktop and/or server configured to run a Microsoft Windows operating system.

The computing device 102 may include one or more volumes 104. As used herein, a volume 104 may be a storage device (e.g., a fixed disk, floppy disk, or CD-ROM), that is formatted to store one or more files 106. A large volume 104 may be divided into more than one logical volume (which may also be referred to as a partition). Each logical volume may be formatted for use by a particular media-based file system (e.g., New Technology File System (NTFS), File Allocation Table (FAT), or Compact Disc File System (CDFS)).

The computing device 102 may be configured to create a shadow copy 108 of a volume 104. As used herein, "shadow copy" may also be referred to as a volume shadow copy. A shadow copy 108 may be generated by a volume shadow copy service (VSS) (also referred to as a volume snapshot service). VSS is a technology included in the Microsoft Windows operating systems that allows taking manual or automatic backup copies (or snapshots) of volumes 104, even when they are in use. It should be noted that a shadow copy 108 may be created for a whole volume 104, not specific files.

In some scenarios, shadow copies 108 may be used for backup software. For example, the backup software may make a shadow copy 108 of a volume 104 (e.g., primary drive). The backup software may read from the shadow copy 108 while the rest of the operating system uses the non-shadow copy file 106 or the non-hidden volume 104.

Shadow Copy technology may use an NTFS file system to create and store shadow copies. It should be noted that a shadow copy 108 can be created for various file systems, but must be stored on a NTFS file system. Shadow copies 108 may be created on local and external (removable or network) volumes 104 by any Windows component that uses this technology. For example, a shadow copy 108 may be created during a scheduled Windows backup or automatic system restore point.

A software VSS provider is a service that may also be included as part of Windows. One or more VSS providers may be registered with the VSS service. A software VSS provider includes components that perform all the necessary data transfer to create a shadow copy 108. Windows comes with a default system VSS provider.

The computing device 102 may also include a VSS writer 122. The VSS writer 122 is a software component that helps to get a consistent copy of data in a shadow copy 108 for a specific software product. The VSS writer 122 is a service that may also be included as part of Windows. A VSS writer 122 is a component that gets called every time a new shadow copy 108 is created.

The VSS writer 122, being a user-mode component, may be used to identify a perpetrator. In an implementation, a VSS writer 122 may be configured to determine a user who requested the creation of a new shadow copy 108.

One or more VSS writers 122 may be registered with the VSS service. A software VSS writer 122 includes components that perform all the necessary data transfer to create a shadow copy 108. In an example, a software VSS writer 122 may be installed on an Active Directory server or Structured Query Language (SQL) server to ensure that a shadow copy 108 receives a coherent state of a database file.

Shadow copies 108 in a Microsoft Windows environment create a mechanism for malicious users and software to gain access to system protected files 106. Typically, sensitive files 106 may be protected from unauthorized access by security features incorporated in NTFS or the Windows file system. One example of such a sensitive file is the Microsoft Active Directory Database (commonly referred to as the "directory information tree (DIT) file" or ".dit file"). Another example of potentially sensitive information is an SQL database. This could also be any file 106 that a user would not normally have access to through the security features of NTFS, or through the Windows file system.

With a shadow copy 108 a user or software can circumvent the security that is configured in NTFS and the Windows file system. This may provide a user with the ability to elevate their privileges and gain access to business sensitive data (commonly referred to as "keys to the kingdom").

In some configurations, the computing device 102 may be a server running Active Directory Domain Services (AD DS). This server is called a domain controller. A domain controller may authenticate and authorize all users and computers in a Windows domain type network. The domain controller may assign and enforce security policies for computers in a Windows domain network. For example, when a user logs into a computer that is part of a Windows domain, Active Directory checks the submitted password and determines whether the user is a system administrator or normal user.

Active Directory stores user credentials (e.g., usernames and passwords) in an Active Directory database. This file 106 is the primary database for the Active Directory environment. This is extremely valuable to both a company as well as hackers. For example, if a hacker can copy those files, the hacker may crack the hashes of the security passwords, and then gain access to whatever resources they want within the company or enterprise.

Within Windows, there are security provisions for ensuring that Active Directory file is not made available to other processes while Active Directory is available on a given domain controller. However, shadow copies 108 present a security challenge. Shadow copies 108 are extremely valuable targets for malicious entities.

Each domain controller has its own copy of the Active Directory file, which may be automatically replicated between those servers to keep them all in sync. Each domain controller is a potential exposure point for the entire Active Directory database since they replicate it among each other. If a hacker gets access to one of these domain controllers, they can get access to all of them, theoretically.

On a Microsoft Windows platform, anyone with sufficient administrative privileges has the ability to create and read data from shadow copies 108 regardless of whether the files 106 copied in the shadow copy 108 are currently protected by the system. In a typical Windows environment, a user with administrative privileges (i.e., an administrator) can make a shadow copy 108 or access a previously created shadow copy 108. In the case of Active Directory, an unauthorized user can read the actual Active Directory database file from that shadow copy 108, despite the protections in place with Microsoft Windows.

As a result, on an Active Directory Domain Controller there are no provisions for who can access this critical directory service data. This bypasses the operating system's internal protections that are available to Active Directory. An unauthorized user may gain access to sensitive information (e.g., password hashes) that are stored in the Active Directory database file.

It should be noted that while the example of Active Directory is discussed, the systems and methods described herein also apply to other sensitive files 106 that may be accessed via a shadow copy 108. For example, a SQL database may be breached using a shadow copy 108.

The systems and methods described herein add value to existing security platforms. Utilizing a combination of file system monitoring and a volume shadow monitoring, a computing device 102 may coordinate both who is allowed to create a shadow copy 108 as well as who can access (e.g., read, copy, etc.) a shadow copy 108. This augments existing system security to prevent unauthorized users the ability to access and create shadow copies 108 of a Microsoft Active Directory Database file or other sensitive files 106. By adding additional intelligence to the volume shadow creation and reading process within a Microsoft Windows environment, an organization's most precious data (e.g., user account and authentication database) may be secured. Once again, it should be noted that in addition to an Active Directory database, the systems and methods described herein apply to any file (e.g., SQL database) that cannot be accessed through the security features of NTFS or the Windows file system, but with a shadow copy 108, these security features may be circumvented.

The computing device 102 may be configured with an agent 110. In an implementation, each Active Directory domain controller in a network may have an agent 110 installed on it. In another implementation, an SQL server may have an agent 110 installed on it.

The agent 110 may be a persistent piece of software installed on the computing device 102. The agent 110 may be embedded or installed on the computing device 102. While running, the agent 110 monitors the one or more shadow copies 108 to see if anyone is attempting to access a shadow copy 108. For example, the agent 110 may monitor whether a user or software is attempting to create, connect to or read from a shadow copy 108.

The agent 110 may be configured with a shadow copy access policy 112. The shadow copy access policy 112 may be a set of rules, conditions, constraints and/or settings that indicate who is authorized to access a shadow copy 108 and the circumstances under which a user account can or cannot access a shadow copy 108.

In an implementation, the shadow copy access policy 112 may be configured with a protected file list 115 of files 106 that are to be protected. These protected files 106 may be designated with restricted shadow copy access. In other words, access to shadow copies 108 of the protected files 106 may restricted or limited to certain designated user accounts, times, dates, etc.

The shadow copy access policy 112 may also include one or more allowed users 114, which may be a list of user accounts that are authorized to access a given shadow copy 108. In an implementation, specific allowed users 114 may be associated with a given shadow copy 108. For example, User A may be allowed to access only shadow copy A and User B may be allowed to access only shadow copy B. In another example, the shadow copy access policy 112 may indicate three user accounts that are authorized to access a shadow copy 108, and all other user accounts (including administrator accounts) cannot access the shadow copy 108.

Additional examples of parameters that may be included in the shadow copy access policy 112 include allowed times for accessing a shadow copy 108, which computing devices 102 an allowed user 114 may access a shadow copy 108, and whether an allowed user 114 can only access a shadow copy 108 that they created.

It should be noted that the shadow copy access policy 112 may supplement any access policies that are configured in the operating system of the computing device 102. For example, the shadow copy access policy 112 may supplement the default file access settings of Windows. The shadow copy access policy 112 may provide much more control over who can access a shadow copy 108 than what is provided in a default Windows configuration. For example, even user accounts with administrative privileges may be configured as unauthorized to access a shadow copy 108.

The agent 110 may monitor one or more shadow copies 108 by performing file system monitoring. For file system monitoring, the agent 110 may load a filter driver 120 to monitor requests to access shadow copies 108. A filter driver 120 may also be referred to as a file system filter driver. The filter driver 120 may add functionality or modify the behavior of the native file system. The filter driver 120 may monitor access to file systems, access to shadow copies 108, and/or creation of new shadow copies 108.

A filter driver 120 is a kernel-mode component that runs as part of the Windows executive. A file system filter driver 120 can filter input/output (I/O) operations for one or more file systems or file system volumes 104. A filter driver 120 may use Microsoft application program interfaces (APIs) that are intended for third parties to be in the data stream. Filter drivers 120 may be chained together so that each one has a chance to look at the data in terms of read requests or the data being returned by the read or write. In an implementation, the filter driver 120 may be a minifilter driver (also referred to as a file system minifilter driver).

The filter driver 120 may intercept I/O requests coming from applications or the operating system. Examples of the file system related activity that may be intercepted by the filter driver 120 include volume mount notifications, file open, creation, read, write, delete, close, etc.

The agent 110 may install the filter driver 120 by using an installation (INF) file and an installation application. A minifilter driver can be loaded at any time while the system is running.

When the filter driver 120 (i.e., a legacy filter driver or minifilter driver) is loaded in the kernel, the filter driver 120 may get a stack of callers. The filter driver 120 may receive the call before the NTFS or file system does. The filter driver 120 has the opportunity to log, inspect, change or block requests before they are passed to the NTFS or file system.

The filter driver 120 may be configured to monitor and prevent unauthorized access to previously created shadow copies 108. Once loaded in the kernel, the filter driver 120 may receive requests to access a shadow copy 108. The filter driver 120 may look at a request to determine who is making the request. The filter driver 120 may also determine what volume 104 the shadow copy 108 is for.

The filter driver 120 may determine whether to prevent unauthorized access to the shadow copy 108 based on the shadow copy access policy 112. The filter driver 120 may be configured with the shadow copy access policy 112. In an implementation, the agent 110 may preconfigure the filter driver 120 with the shadow copy access policy 112 when creating the filter driver 120. In another implementation, the filter driver 120 may request the shadow copy access policy 112 from the agent 110.

The filter driver 120 may determine whether the user account requesting access to the shadow copy 108 is authorized to access the shadow copy 108. In an implementation, the filter driver 120 may determine whether the user account made the requested shadow copy 108. If the user account did not make the requested shadow copy 108, then the request may be denied.

In another implementation, the filter driver 120 may determine whether the user account has authorization to access shadow copies 108 based on the shadow copy access policy 112. For example, the filter driver 120 may determine whether the user account is included in the list of allowed users 114.

In yet another implementation, the filter driver 120 may determine whether the request for a shadow copy 108 includes a file 106 in the protected file list 115. For example, the filter driver 120 may determine whether the request for a shadow copy 108 includes the Active Directory database file, or other file 106 identified as protected.

In an example, the computing device 102 may be a domain controller. The agent 110 may configure a filter driver 120 to monitor and prevent unauthorized access to an existing shadow copy 108 on the computing device 102. In this example, only a domain administrator who is authorized can access an existing shadow copy 108 on the computing device 102.

In this example, an administrator of the computing device 102 who is not the authorized domain administrator may log into the computing device 102 (to perform maintenance on the computing device 102, for instance), and there are existing shadow copies 108 on the computing device 102. The administrator may have access to backup software that is currently running. In this case, if the administrator attempts to read or copy the shadow copies 108 using the backup software, the filter driver 120 will intercept this request, check the shadow copy access policy 112 and determine that the administrator is not authorized to access the shadow copies 108. The filter driver 120 may deny the request before it is sent to file system.

It should be noted in this example, that without the systems and methods described herein, anyone with administrative privileges may access (e.g., read or copy) existing shadow copies 108. The filter driver 120 described herein may be configured to intercept and authenticate shadow copy requests even by administrators. The filter driver 120 may determine whether a user account with administrative privileges is authorized to access one or more shadow copies 108 according to the shadow copy access policy 112. The filter driver 120 may then allow or deny the request.

In another aspect, the filter driver 120 described herein may provide copy monitoring via region access. In an implementation, the filter driver 120 may perform region-based monitoring of file reads to imply whether a file 106 was copied. The computing device 102 may infer a file 106 is copied, since at the filter driver level, everything looks like a read. Therefore, the computing device 102 may not know whether someone is just reading a section of the file 106, or if they are copying the file 106.

The agent 110 may also perform region access copy monitoring that configures the filter driver 120 to perform copy monitoring via region access. In an implementation, the filter driver 120 may map regions in a sensitive file 106 or shadow copy 108 to bits in a bit array. Then as the filter driver 120 observes requests that come along to read the sensitive file 106 or shadow copy 108, the filter driver 120 may mark one of those bits as dirty (e.g., change the bit from 0 to 1). If the filter driver 120 sees all of the bits get dirty before the file 106 is closed, the filter driver 120 may flag this as a possible copy. The agent 110 may then issue an alert or may prevent further access to the sensitive file 106 or shadow copy 108. If the filter driver 120 determines that a possible copy has occurred, the filter driver 120 may further evaluate the shadow copy access policy 112 to determine if the copy is authorized.

It should be noted that this copy detection by looking at the regions accessed, can be used independent of shadow copy security. For example, the agent 110 may configure a filter driver 120 to monitor normal Windows file system access as well as the shadow copy 108.

The agent 110 may use the filter driver 120 to monitor and prevent unauthorized access to a previously created shadow copy 108. In another aspect of the described systems and methods, the agent 110 may use the filter driver 120 to intercept requests to create a shadow copy 108.

Another security challenge with shadow copies 108 is the creation of a new shadow copy 108. Within Windows, a volume shadow service (VSS) provider may be created to manage running volumes 104 and create the shadow copies 108 of them on demand. For example, a VSS subsystem may create a shadow copy 108 when an administrator initiates a backup of a volume 104. As described above, a shadow copy 108 is a result of the collaboration of many components of VSS infrastructure: a VSS provider creates a physical shadow copy 108, VSS writers 122 ensure a consistent snapshot of data, and the VSS service orchestrates the process.

Currently, anyone with sufficient administrative privileges may create a shadow copy 108 of a volume 104 containing a protected file 106 (e.g., the Active Directory database file), which bypasses the protections that Windows has. Therefore, this provides another vector of attack on the security of a system. In addition to preventing access to preexisting shadow copies 108, the systems and methods described herein utilize a filter driver 120 to prevent unauthorized creation of a shadow copy 108.

The filter driver 120 described herein may be used to prevent the creation of volume of shadow copies 108. This may be used to prevent data exfiltration through volume shadow copies 108.

The VSS writer 122 described herein may be a custom VSS writer that is configured to detect a user who initiated an unauthorized creation of a shadow copy 108. The agent 110 may invoke a VSS writer 122 to intercept a request to create a shadow copy 108.

Once created, the VSS writer 122 has access to the current executing thread. The VSS writer 122 may intercept a request for creating a shadow copy 108. The VSS writer 122 may then assess the request according to the shadow copy access policy 112. For example, the VSS writer 122 may determine who the invoker was and whether the invoker is an allowed user. If the VSS writer 122 determines the invoker is not allowed to make shadow copies 108, the VSS writer 122 may prevent the shadow copy from being made. If the VSS writer 122 determines the invoker is allowed to make shadow copies 108, the VSS writer 122 may allow the shadow copy creation request.

In an example, an administrator of an Active Directory environment may log into the main domain controller. This domain controller may have a replicated copy of the Active Directory database file with password hashes. This administrator may log into the domain controller to perform a backup, but is not the administrator of the domain.

Without the described systems and methods, the administrator in this example, would have the ability to do backups and restores, and that would create a volume shadow copy 108. The Active Directory database cannot be copied while it is being used. However, a shadow copy 108 of the Active Directory database may be created by this administrator, and the sensitive data may be extracted from that shadow copy 108, bypassing the NTFS and file system security, which do not apply at that point to the shadow copy 108.

With the filter driver 120 described herein, this type of security breach can be avoided. The filter driver 120 would intercept the shadow copy creation request from the unauthorized administrator. The filter driver 120 may block the creation of a shadow copy 108 based on the shadow copy access policy 112. For example, the shadow copy access policy 112 may block the creation of a shadow copy 108 during specific hours (e.g., an account that has access to invoke a backup may be scheduled to run once every week at a certain time). The request from the unauthorized administrator may then be denied. This would prevent the volume shadow copy 108 from being created.

The systems and methods described herein provide heightened security to a computing environment. Unauthorized shadow copy creation and unauthorized access to existing shadow copies 108 may be prevented by a filter driver approach. The systems and methods address the deficiencies in current file system security.

Figure 2:
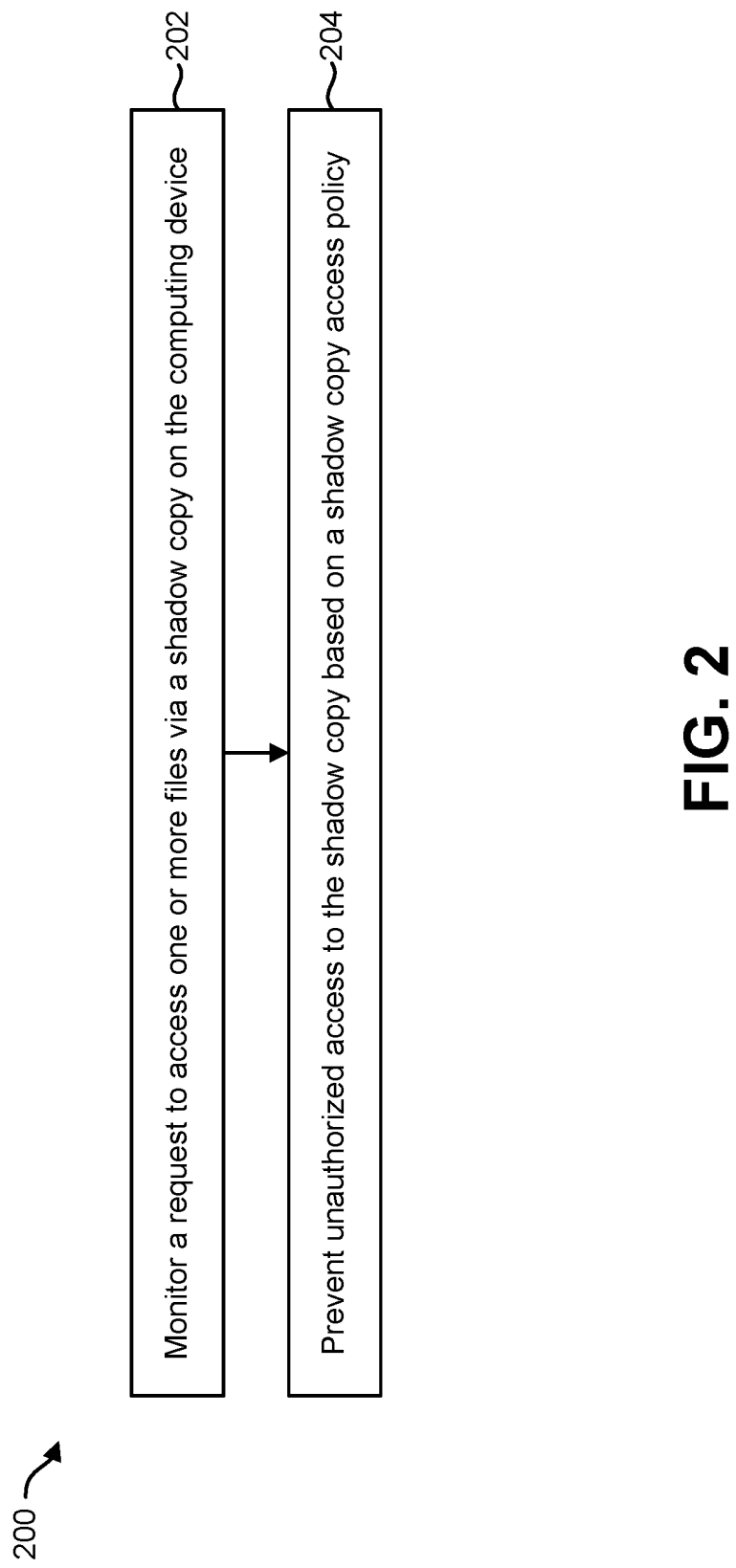
FIG. 2 is a flow diagram illustrating one configuration of a method for shadow copy access prevention.

FIG. 2 is a flow diagram illustrating one configuration of a method 200 for shadow copy access prevention. The method 200 may be implemented by a computing device 102. In an implementation, the computing device 102 may be a domain controller. For example, the computing device 102 may be a server running Active Directory Domain Services (AD DS).

The computing device 102 may monitor 202 a request to access one or more files 106 via a shadow copy 108 on the computing device 102. In an implementation, the one or more files 106 may include an Active Directory database. In another implementation, the one or more files 106 may include an SQL database.

In a scenario, the request to access the shadow copy 108 may be a request to create a shadow copy 108 of the one or more volumes 104. For example, if the request is for a backup, the shadow copy 108 may not currently exist and may need to be created.

In another scenario, the request to access the shadow copy 108 may include a request to access a previously created shadow copy 108. For example, a shadow copy 108 may currently be stored on the computing device 102.

In an implementation, the computing device 102 may monitor 202 a request to access a shadow copy 108 using a filter driver 120. In this implementation, the filter driver 120 may intercept a request for a previously created shadow copy 108. This may be accomplished as described in connection with FIG. 3. In an approach, the filter driver 120 may be a file system minifilter driver.

In another implementation, the computing device 102 may monitor 202 by invoking the filter driver 120 to intercept a request to create a shadow copy 108. This may be accomplished as described in connection with FIG. 4.

The computing device 102 may prevent 204 unauthorized access to the shadow copy 108 based on a shadow copy access policy 112. The computing device 102 may prevent access to the one or more files 106 on the shadow copy 108 based on a specific user, group membership, file path and/or time of day. In an implementation, the computing device 102 may determine whether a user account associated with the request is included in the shadow copy access policy 112. In another implementation, the computing device 102 may determine whether the user account associated with the request is authorized to access the shadow copy 108 on the computing device 102. In yet another implementation, the computing device 102 may determine that a user account with administrative privileges is not authorized to access the shadow copy 108 according to the shadow copy access policy 112.

If the computing device 102 determines that the request is unauthorized, the computing device 102 may deny access to the shadow copy 108. Otherwise, the computing device 102 may allow the request to access the shadow copy 108 to proceed.

Figure 3:
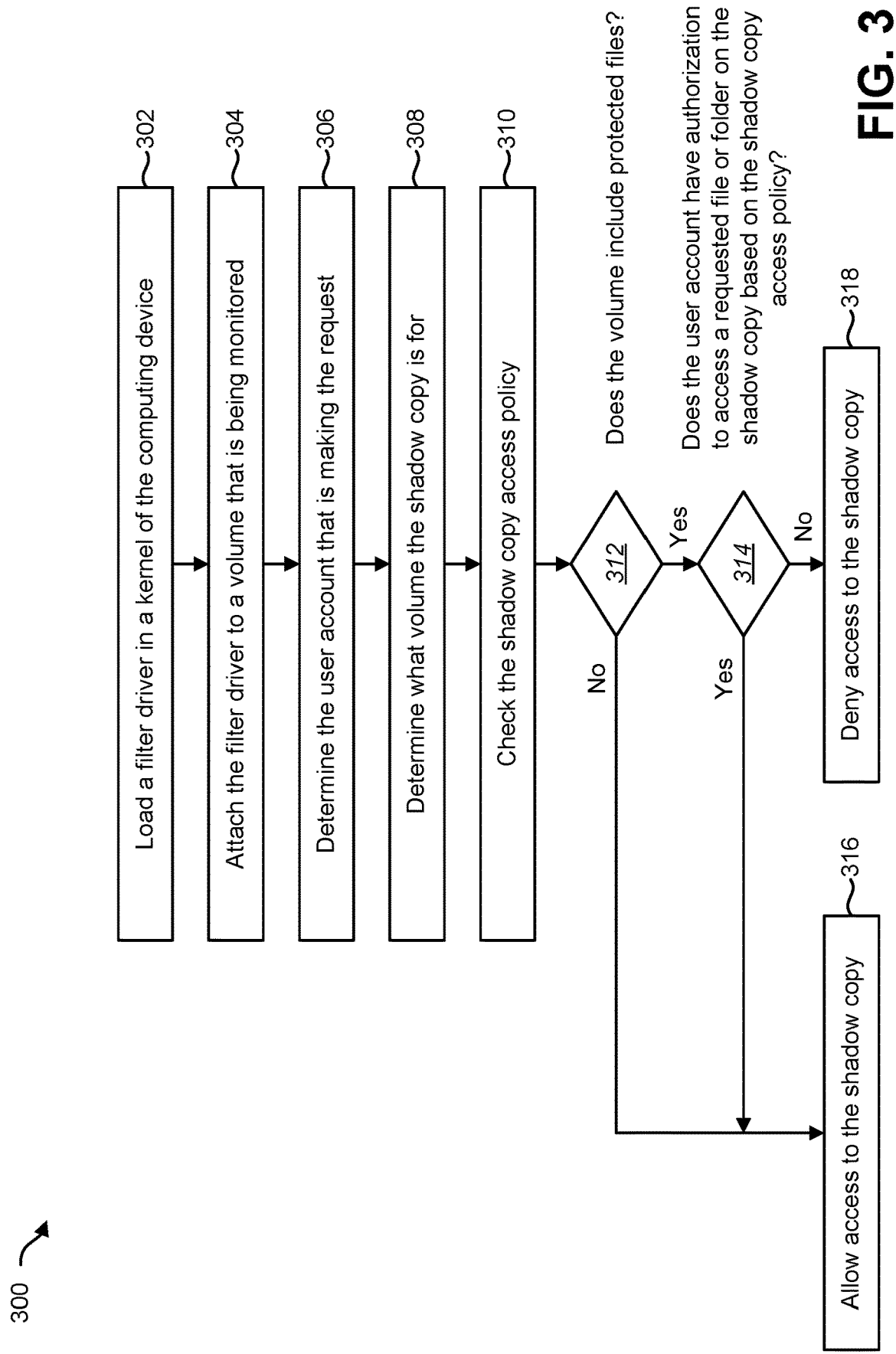
FIG. 3 is a flow diagram illustrating another configuration of a method for shadow copy access prevention.

FIG. 3 is a flow diagram illustrating another configuration of a method 300 for shadow copy access prevention. The method 300 may be implemented by a computing device 102. In an implementation, the computing device 102 may be configured with an agent 110.

The computing device 102 may load 302 a filter driver 120 in the kernel of the computing device 102. In an implementation, the filter driver 120 may be a minifilter driver. The agent 110 may install the filter driver 120 by using an INF file and an installation application.

The computing device 102 may attach 304 the filter driver 120 to a volume 104 that is being monitored. The volume 104 may store one or more protected files 106 that are designated with restricted shadow copy access. This may include the Active Directory database, a SQL database or other sensitive data. The agent 110 may attach the filter driver 120 to the volume 104 by registering this volume 104 with the filter manager. The agent 110 may instruct the filter manager to pass requests for shadow copies 108 to the filter driver 120.

The computing device 102 may determine 306 the user account that is making the request. For example, the filter driver 120 may extract the user account that invoked the request. In an implementation, the operation system may provide a documented way to access the information (e.g., a user token) about the user requesting the operation both for local file operations and operations performed by remote users.

The computing device 102 may determine 308 what volume 104 the shadow copy 108 is for. For example, the filter driver 120 may extract, from the intercepted request, the volume 104 that is associated with the shadow copy request. In an implementation, the agent 110 uses the VSS API to list all existing shadow copies 108. For each shadow copy 108, the agent 110 may save the original volume name and a path of a shadow copy 108 (e.g., a volume path of a shadow copy 108). The agent 110 may pass the list to the filter driver 120. When the filter driver 120 intercepts a request to access a file on a shadow copy 108, it may compare the volume path in the request to the paths of previously retrieved shadow copies 108. When a match is found, the filter driver 120 obtains a corresponding name of the original volume.

The computing device 102 may check 310 the shadow copy access policy 112 to determine whether the request should be authorized. For example, the agent 110 may configure the filter driver 120 with the shadow copy access policy 112. In an implementation, the shadow copy access policy 112 may include allowed users 114 (e.g., user accounts) who can access shadow copies 108. The shadow copy access policy 112 may also include a protected file list 115 that indicates which files 106 should be monitored to prevent access via unauthorized shadow copies 108.

The computing device 102 may determine 312 whether the volume 104 associated with the request includes one or more protected files 106. For example, the filter driver 120 may check the shadow copy access policy 112 to determine which files 106 are designated protected files. If the volume 104 does not include any protected files 106, then the filter driver 120 may allow 316 access to the shadow copy 108.

If the volume 104 includes one or more protected files 106, then the computing device 102 may determine 314 whether the user account has authorization to access a requested file or folder on the shadow copy 108 based on the shadow copy access policy 112. For example, the filter driver 120 may evaluate one or more conditions according to the shadow copy access policy 112.

In an implementation, the filter driver 120 may query the shadow copy access policy 112 to determine whether the user account is authorized to access the requested file or folder on the shadow copy 108. In another implementation, the filter driver 120 may determine whether the user account is included in the allowed users 114. In another implementation, the filter driver 120 may determine whether the user account made the shadow copy, and may deny 318 access if not. In yet another implementation, the filter driver 120 may determine if shadow copy access is allowed for the current time or date. It should be noted that other policy conditions may be evaluated to determine whether to authorize the shadow copy request.

If the computing device 102 determines 314 that the user account is authorized to access the shadow copy 108, then the computing device 102 may allow 316 access to the shadow copy 108. Otherwise, the computing device 102 may deny 318 access to the shadow copy 108.

Figure 4:
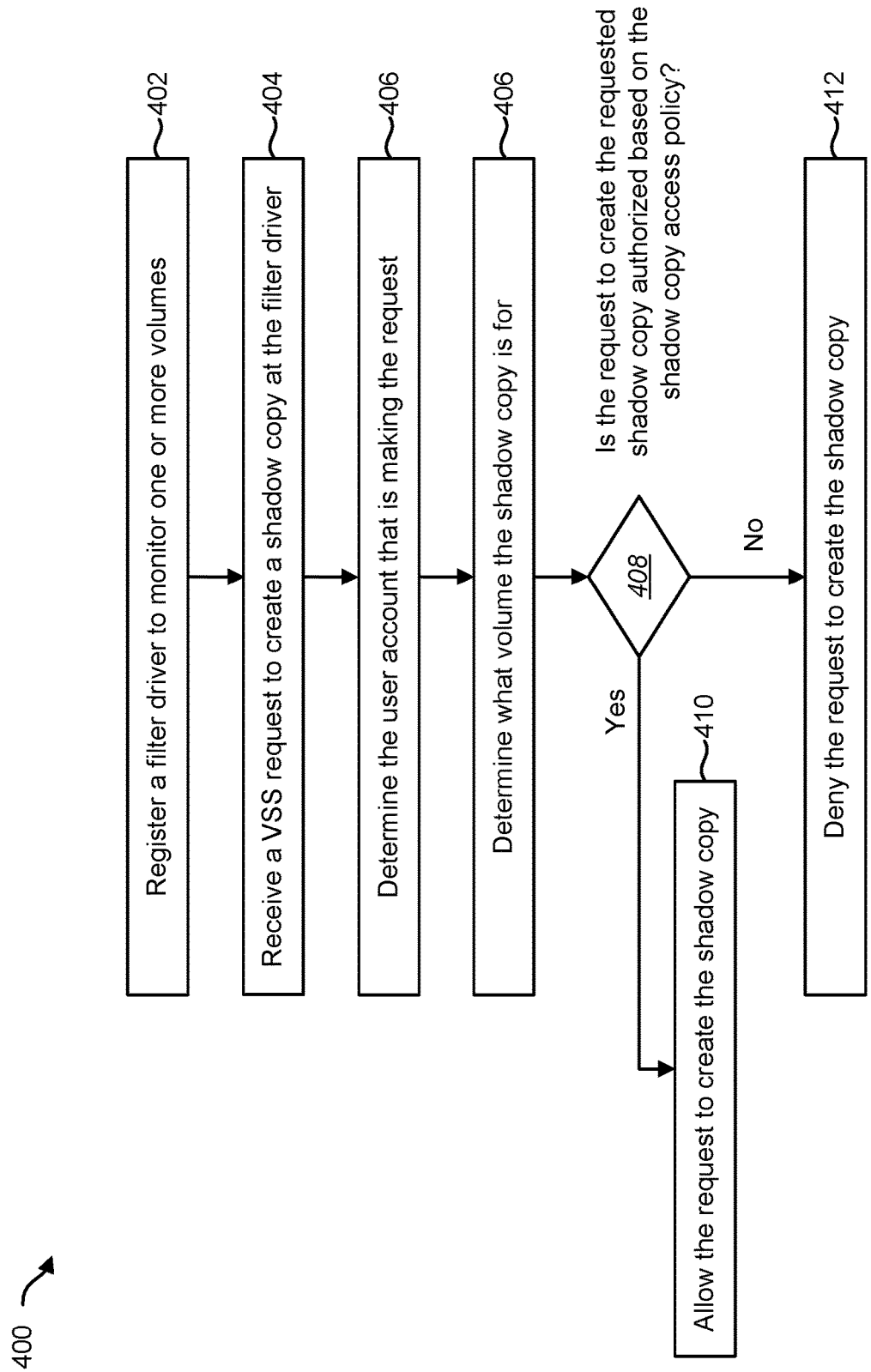
FIG. 4 is a flow diagram illustrating a configuration of a method for shadow copy creation prevention.

FIG. 4 is a flow diagram illustrating a configuration of a method 400 for shadow copy creation prevention. The method 400 may be implemented by a computing device 102. In an implementation, the computing device 102 may be configured with an agent 110.

The computing device 102 may register 402 a filter driver 120 to monitor one or more volumes 104. The filter driver 120 may be configured to intercept requests to create a shadow copy 108.

The computing device 102 may receive 404 a VSS request to create a shadow copy 108. Once created, the filter driver 120 has access to the current executing thread. The filter driver 120 may intercept a request for creating a shadow copy 108.

The computing device 102 may determine 406 the user account that is making the request. For example, the VSS writer 122 may determine who invoked the request by parsing the intercepted request.

The computing device 102 may determine 408 what volume 104 the shadow copy 108 is for. For example, the filter driver 120 may extract, from the intercepted request, the volume 104 that is associated with the shadow copy request. The VSS service notifies all the drivers (including the filter driver 120) attached to a volume 104 that it is about to create a shadow copy 108. The drivers are expected to prepare for shadow copy creation, which may include flushing their in-memory buffers to disk and holding further writes until the creation completes. The filter driver 120 may subscribe to these notifications from the VSS service.

The computing device 102 may determine 410 whether the request to create the requested shadow copy 108 is authorized based on the shadow copy access policy 112. For example, the agent 110 may configure the filter driver 120 with the shadow copy access policy 112. In an implementation, the shadow copy access policy 112 may include allowed users 114 (e.g., user accounts) who can access shadow copies 108. The shadow copy access policy 112 may also include a protected file list 115 that indicates which files 106 should be monitored to prevent access via unauthorized shadow copies 108. The shadow copy access policy 112 may also block creation of a shadow copy 108 during specific times.

If the computing device 102 determines 410 that the request is authorized, then the computing device 102 may allow 412 the request to create the shadow copy 108. Otherwise, the computing device 102 may deny 414 the request to create the shadow copy 108.

Figure 5:
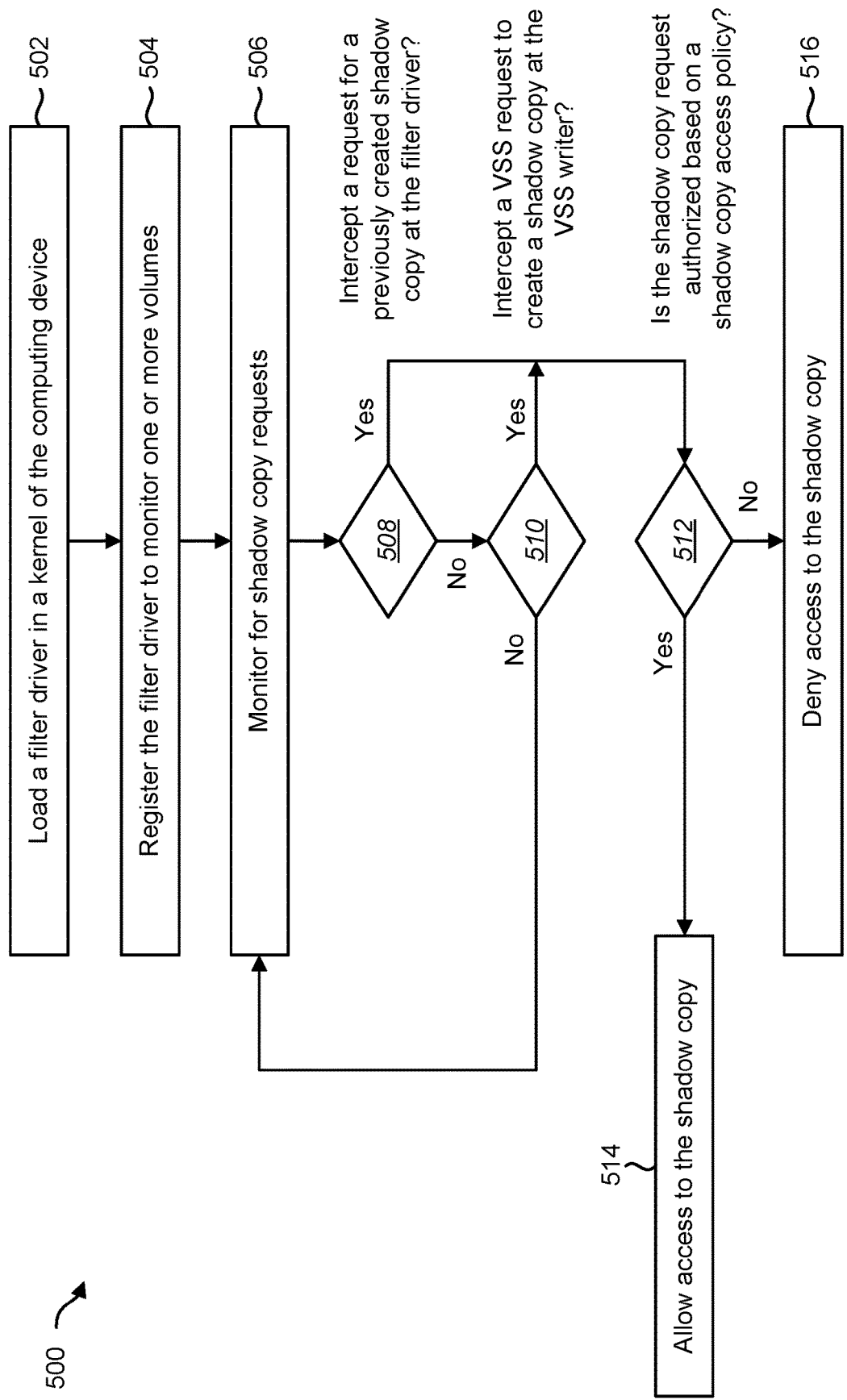
FIG. 5 is a flow diagram illustrating yet another configuration of a method for shadow copy access prevention.

FIG. 5 is a flow diagram illustrating yet another configuration of a method 500 for shadow copy access prevention. The method 500 may be implemented by a computing device 102. In an implementation, the computing device 102 may be configured with an agent 110.

The computing device 102 may load 502 a filter driver 120 in a kernel of the computing device 102. This may be accomplished as described in connection with FIG. 3.

The computing device 102 may register 504 the filter driver 120 to monitor one or more volumes 104 on the computing device 102. This may be accomplished as described in connection with FIG. 4.

The computing device 102 may monitor 506 for shadow copy requests. For example, the filter driver 120 may check the stack of callers in the kernel to intercept any requests to access (e.g., read or copy) previously created shadow copies 108. The filter driver 120 has access to the current executing thread. The filter driver 120 may intercept a request for creating a shadow copy 108. In an approach, a VSS writer 122 may be used to determine who invoked the request by parsing the intercepted request.

If the filter driver 120 does not intercept 508 a request for a previously created shadow copy 108, or if the filter driver 120 does not intercept 510 a VSS request to create a shadow copy 108, then the computing device 102 may continue to monitor 506 for shadow copy requests.

If the filter driver 120 intercepts 508 a request for a previously created shadow copy 108, or if the filter driver 120 intercepts 510 a VSS request to create a shadow copy 108, then the computing device 102 may determine 512 whether the shadow copy request is authorized based on the shadow copy access policy 112.

The filter driver 120 may be configured with the shadow copy access policy 112. In an implementation, the shadow copy access policy 112 may include allowed users 114 (e.g., user accounts) who can access shadow copies 108. The shadow copy access policy 112 may also include a protected file list 115 that indicates which files 106 should be monitored to prevent access via unauthorized shadow copies 108. The shadow copy access policy 112 may also block creation of a shadow copy 108 during specific times.

If the computing device 102 determines 512 that the shadow copy request is authorized, then the computing device 102 may allow 514 access to the shadow copy 108. Otherwise, the computing device 102 may deny 516 access to the shadow copy 108.

Figure 6:
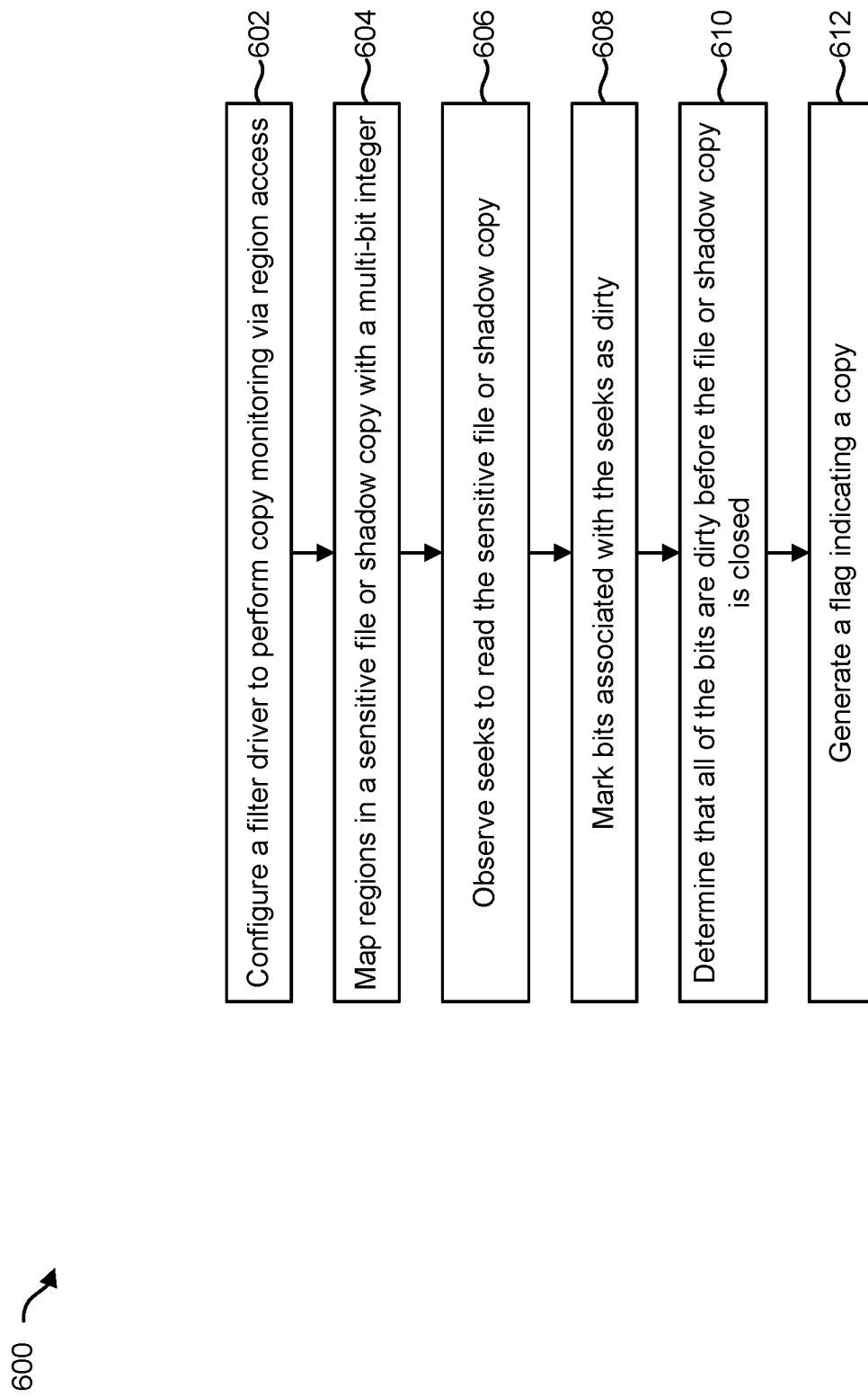
FIG. 6 is a flow diagram illustrating a configuration of a method for file access prevention.

FIG. 6 is a flow diagram illustrating a configuration of a method 600 for file access prevention. The method 600 may be implemented by a filter driver 120.

The computing device 102 may configure 602 a filter driver 120 to perform copy monitoring via region access. For example, the computing device 102 may load a filter driver 120 in the kernel of the computing device 102. In an implementation, the filter driver 120 may be a minifilter driver. The computing device 102 may install the filter driver 120 by using an INF file and an installation application. The computing device 102 may attach 304 the filter driver 120 to a volume 104 that is being monitored.

The filter driver 120 may map 604 regions in a sensitive file 106 or shadow copy 108 with bits in a bit array.

The filter driver 120 may observe 606 seeks to read the sensitive file 106 or shadow copy 108. For example, when the filter driver 120 is loaded in the kernel, the filter driver 120 may intercept the stack of callers. These calls to read a sensitive file 106 or shadow copy 108 may be passed to the filter driver 120 via the filter manager.

The filter driver 120 may mark 608 one of the bits associated with the seek as dirty. For example, the filter driver 120 may change a mapped bit from 0 to 1.

If the filter driver 120 determines 610 that all of the bits are dirty before the file 106 or shadow copy 108 is closed, the filter driver 120 may generate 612 a flag indicating that these reads are a possible copy. Otherwise, the filter driver 120 may infer 614 that no copy has occurred.

In an implementation, the computing device 102 may issue an alert or may prevent further access to the sensitive file 106 or shadow copy 108. If the filter driver 120 determines that a possible copy has occurred, the filter driver 120 may further evaluate the shadow copy access policy 112 to determine if the copy is authorized.

Figure 7:
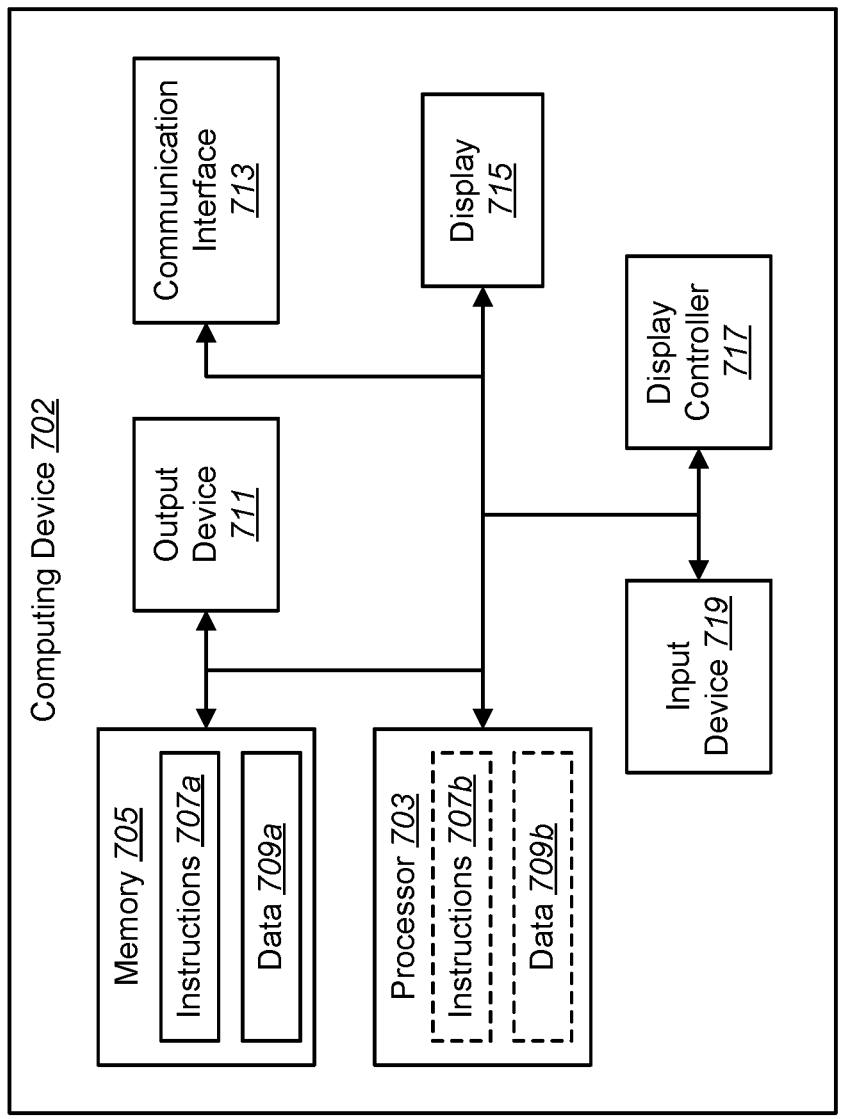
FIG. 7 is a block diagram illustrating components that may be utilized by a computing device.

FIG. 7 is a block diagram illustrating components that may be utilized by a computing device 702. The computing device 702 may be configured to perform shadow copy access prevention as described herein.

The computing device 702 may communicate with other electronic devices through one or more communication interfaces 713. Communication through the communication interface 713 may be achieved through different methods such as wired communication, wireless communication or both wired and wireless communication. For example, the communication interface 713 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 702 may receive and transmit information through one or more input devices 719 and one or more output devices 711. The input devices 719 may be a keyboard, mouse, microphone, remote control device, button, joystick, trackball, touchpad, lightpen, etc. The output devices 711 may be a speaker, printer, etc. A display device 715 is an output device that may be included in a computer system. Display devices 715 may project information through different technologies, such as liquid crystal display (LCD), light-emitting diode (LED), gas plasma, electroluminescence, a cathode ray tube (CRT) or the like.

A processor 703 controls the operation of the computing device 702 and may be a microprocessor, a microcontroller, a digital signal processor (DSP) or other device known in the art. A memory 705 may be included in the computing device 702 and includes instructions 707a and data 709a to assist the processor 703 in operating the computing device 702. The memory 705 may send program instructions 707b and/or data 709b to the processor 703 in order for the processor 703 to perform logical and arithmetic operations according to methods disclosed herein. The processor 703 may execute one or more of the instructions stored in the memory 705 to implement one or more of the systems and methods disclosed herein.

Data 709a stored in the memory 705 may be converted to text, graphics and/or moving images (as appropriate) by a display controller 717. Of course, FIG. 7 illustrates only one possible configuration of a computing device 702. Various other architectures and components may be utilized.

In an implementation, the computing device 702 may be a headless server. For example, the computing device 702 may be configured to provide services to other computing devices with or without peripheral input/output interfaces.

In another implementation, the computing device 702 may be configured to run on desktop and server hardware, both physical and virtual. In yet another implementation, the computing device 702 may be configured to run desktop and server Microsoft Windows operating systems.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth, including virtual. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:
   monitoring a request to create a shadow copy on a computing device, wherein monitoring the request to create the shadow copy comprises invoking a filter driver to intercept the request to create the shadow copy, wherein upon receiving the request to create the shadow copy, the filter driver:
      determines a user account that is making the request;
      determines what volume the shadow copy is for; and
      determines whether the user account has authorization to create the shadow copy based on a shadow copy access policy; and
   preventing unauthorized access to the shadow copy based on the shadow copy access policy.

2. The method of claim 1, wherein preventing unauthorized access to the shadow copy comprises:
   denying the request to create the shadow copy based on a specific user, group membership, file path and/or time of day.

3. The method of claim 1, wherein preventing unauthorized access to the shadow copy further comprises:
   determining whether a user account associated with the request is authorized to create the shadow copy on the computing device.

4. The method of claim 1, wherein preventing unauthorized access to the shadow copy comprises:
   determining that a user account is not authorized to create the shadow copy according to the shadow copy access policy.

5. The method of claim 1, further comprising designating one or more protected files with restricted shadow copy access.

6. The method of claim 1, wherein a volume shadow copy service monitor accesses a current executing thread to determine the invoker of the request.

7. The method of claim 1, wherein if a request to create a shadow copy is not authorized by the shadow copy access policy, the filter driver prevents the shadow copy from being made.

8. The method of claim 1, further comprising configuring the filter driver to perform copy monitoring via region access.

9. The method of claim 8, wherein copy monitoring via region access comprises:
   mapping regions in a sensitive file or shadow copy with bits of a bit array;
   observing seeks to read the sensitive file or shadow copy;
   marking bits associated with the seeks as dirty;
   determining that all of the bits are dirty before the sensitive file or shadow copy is closed; and
   generating a flag indicating a copy.

10. A computing device, comprising:
    a processor;
    a memory in electronic communication with the processor; and
    instructions stored in the memory, the instructions being executable to:
       monitor a request to create a shadow copy on the computing device, wherein monitoring the request to create the shadow copy comprises invoking a filter driver to intercept the request to create the shadow copy, wherein upon receiving the request to create the shadow copy, the filter driver:
          determines a user account that is making the request;
          determines what volume the shadow copy is for; and
          determines whether the user account has authorization to create the shadow copy based on a shadow copy access policy; and
       prevent unauthorized access to the shadow copy based on the shadow copy access policy.

11. The computing device of claim 10, wherein the instructions executable to prevent unauthorized access to the shadow copy comprise instructions executable to:
    deny the request to create the shadow copy based on a specific user, group membership, file path and/or time of day.

12. The computing device of claim 10, wherein the instructions executable to prevent unauthorized access to the shadow copy comprise instructions executable to:
    determine whether a user account associated with the request is authorized to create the shadow copy on the computing device.

13. The computing device of claim 10, wherein the instructions executable to prevent unauthorized access to the shadow copy comprise instructions executable to:
    determine that a user account is not authorized to create the shadow copy according to the shadow copy access policy.

14. The computing device of claim 10, wherein the instructions are further executable to designate one or more protected files with restricted shadow copy access.

15. The computing device of claim 10, wherein a volume shadow copy service monitor accesses a current executing thread to determine the invoker of the request.

16. The computing device of claim 10, wherein if a request to create a shadow copy is not authorized by the shadow copy access policy, the filter driver prevents the shadow copy from being made.

17. The computing device of claim 10, wherein the instructions are further executable to configure the filter driver to perform copy monitoring via region access.

18. The computing device of claim 17, wherein copy monitoring via region access comprises:
    mapping regions in a sensitive file or shadow copy with bits of a bit array;
    observing seeks to read the sensitive file or shadow copy;

marking bits associated with the seeks as dirty;
determining that all of the bits are dirty before the sensitive file or shadow copy is closed; and
generating a flag indicating a copy.

\* \* \* \* \*